(12) United States Patent
McIntosh et al.

(10) Patent No.: US 7,298,901 B2
(45) Date of Patent: Nov. 20, 2007

(54) SCANNABLE FORM AND SYSTEM

(75) Inventors: Jacky L. McIntosh, Mission Viejo, CA (US); Larry Tucholski, Lake Forest, CA (US)

(73) Assignee: Scantron Corporation, Irvine, CA (US)

( * ) Notice: Subject to any disclaimer, the term of this patent is extended or adjusted under 35 U.S.C. 154(b) by 716 days.

(21) Appl. No.: 10/820,454

(22) Filed: Apr. 7, 2004

(65) Prior Publication Data

US 2005/0226541 A1    Oct. 13, 2005

(51) Int. Cl.
G06K 9/18 (2006.01)
G06K 9/20 (2006.01)
G09B 3/00 (2006.01)
G09B 7/00 (2006.01)

(52) U.S. Cl. .............. 382/182; 382/317; 434/354; 434/358

(58) Field of Classification Search .......... 382/182, 382/317; 434/354–358
See application file for complete search history.

(56) References Cited

U.S. PATENT DOCUMENTS

| 4,877,948 A | * | 10/1989 | Krueger ............... 235/449 |
| 5,085,587 A | | 2/1992 | DesForges et al. |
| 5,134,669 A | * | 7/1992 | Keogh et al. ............ 382/318 |
| 5,452,379 A | | 9/1995 | Poor |
| 5,711,673 A | | 1/1998 | Grundy, Jr. |
| 5,913,204 A | * | 6/1999 | Kelly .................. 705/500 |
| 6,173,154 B1 | * | 1/2001 | Kucinski et al. ......... 434/359 |
| 6,357,658 B1 | * | 3/2002 | Garczynski et al. ... 235/462.01 |
| 6,786,396 B2 | * | 9/2004 | Constantine ............ 235/375 |
| D519,156 S | * | 4/2006 | McIntosh et al. ......... D19/59 |
| 2004/0131279 A1 | * | 7/2004 | Poor ................... 382/287 |

OTHER PUBLICATIONS

NCS Test Sheet, 1994, National Computer Systems.*
International Search Report, International Application No. PCT/US05/08305, 1 page, dated Mar. 9, 2006.
Scantron Form No. X-103979-UCD, Scantron Corporation 1999 M4 3999-222-21.

* cited by examiner

Primary Examiner—Bhavesh M Mehta
Assistant Examiner—Manav Seth
(74) Attorney, Agent, or Firm—Fish & Richardson P.C.

(57) ABSTRACT

A scannable form with a numeric value block, a plurality of response control marks, response receiving rows, and a zone for a bar code, optical character recognition (OCR) spaces and/or intelligence character recognition (ICR) spaces. The scannable form may be scanned by two different devices.

35 Claims, 11 Drawing Sheets

SCANNABLE FORM AND SYSTEM

BACKGROUND

The present disclosure relates to machine scannable forms and systems for scanning such forms. Automatic scanning machines for scanning preprinted forms save time for an operator compared to manually grading student or survey response forms. Automatic scanning machines and preprinted forms enable rapid monitoring of items and personnel, and permits more frequent record keeping or testing than might otherwise be achieved if an operator had to check the forms manually. For example, such machines are frequently used to score scholastic test results, tally attendance data, and tally inventory.

SUMMARY

Presently, machine scannable forms are sold in packs by retailers, such as school book stores. It may be difficult to put a mark on each individual form to indicate a sales price because such mark may interfere with scanning response marks entered by a student.

A scannable form is disclosed with a numeric value block, a plurality of response control marks, response receiving rows, and a zone for a bar code, optical character recognition (OCR) spaces and/or intelligence character recognition (ICR) spaces. The response control marks indicate positions of the response receiving rows, which can include numeric values or multiple choice letters. A scanner detects and interprets entries in the response receiving rows. The scanner can combine one or more numeric values with a tally derived from multiple choice response inputs on the scannable form. The scannable form allows a mathematical operation to be performed by a scanner between the numeric value and the correct question response. The numeric value may represent the result of a related test, which is then mathematically combined with the tallied result of a set of multiple response inputs to obtain a total. The numeric value can also be used to assign weights to different responses.

The scannable form may use either a horizontal format, in which a fixed number of response receiving spaces are row aligned with each response control mark, or a vertical format, in which a single response receiving space is aligned with each response control mark. In the vertical format, the number of response choices per question is not fixed. A format mode selection mark (or the absence of such a mark) automatically conditions the scanner for vertical or horizontal operation.

The form may provide a number of advantages. For example, the bar code allows retailers, such as school book stores, to assign a price to each form and track product inventory without interfering with scanning operations of completed forms.

One general aspect relates to a scannable form comprising (a) an elongate rectangular shape with first and second substantially straight longitudinal edges; (b) at least two response columns parallel to the first longitudinal edge; and (c) a control mark column, parallel to the first longitudinal edge and parallel to the response column but spaced therefrom. The control mark column contains, in a direction parallel to the first longitudinal edge: (1) a first set of response control marks having a first length; (2) a second set of response control marks having the first length; (3) a start-of-form mark having a second length different from the first length; and (4) an end-of-form mark having a third length different from the first length and the second length. The first set of response control marks is column aligned with the start-of-form mark and before the second set of response control marks. The start-of-form mark is column aligned before the second set of response control marks, and the second set of response control marks is column aligned before the end-of-form mark. The scannable form further comprises (d) a response row corresponding to each response control mark. Each response row is row aligned with the corresponding response control mark perpendicular to the first longitudinal edge. Each response row contains at least two response receiving spaces, and each response receiving space is aligned in one of said response columns. The first set of response control marks is associated with response rows that have numeric value response receiving spaces. The scannable form further comprises (e) a bar code in at least one of a first location and a second location. The first location is a first pre-determined distance below the end-of-form mark and a second pre-determined distance above a bottom edge of the form. The second location is a third pre-determined distance from at least one response row and a fourth pre-determined distance from one of the first and second longitudinal edges. The bar code is sufficiently spaced away from the response rows to avoid false detection of marks in the response rows.

Another general aspect relates to a method of making a scannable form. The method comprises: printing on a form having an elongate rectangular shape with first and second substantially straight longitudinal edges. The form has (a) at least two response columns parallel to the first longitudinal edge; and (b) a control mark column, parallel to the first longitudinal edge and parallel to the response column but spaced therefrom. The control mark column contains, in a direction parallel to the first longitudinal edge: (1) a first set of response control marks having a first length; (2) a second set of response control marks having the first length; (3) a start-of-form mark having a second length different from the first length; and (4) an end-of-form mark having a third length different from the first length and the second length. The first set of response control marks is column aligned with the start-of-form mark and before the second set of response control marks. The start-of-form mark is column aligned before the second set of response control marks, and the second set of response control marks is column aligned before the end-of-form mark. The form also has (c) a response row corresponding to each response control mark. Each response row is row aligned with the corresponding response control mark perpendicular to the first longitudinal edge. Each response row contains at least two response receiving spaces. Each response receiving space is aligned in one of said response columns. The first set of response control marks is associated with response rows that have numeric value response receiving spaces. The form also has (d) a bar code in at least one of a first location and a second location. The first location is a first pre-determined distance below the end-of-form mark and a second pre-determined distance above a bottom edge of the form. The second location is a third pre-determined distance from at least one response row and a fourth pre-determined distance from one of the first and second longitudinal edges. The bar code is sufficiently spaced away from the response rows to avoid false detection of marks in the response rows.

The details of one or more aspects are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

The following description is not to be taken in a limiting sense, but is made merely for the purpose of illustrating one or more uses of a scannable form and scanner, such as to aid in test scoring, recording of school attendance, inventory, or any other type of record keeping.

Figure 1:
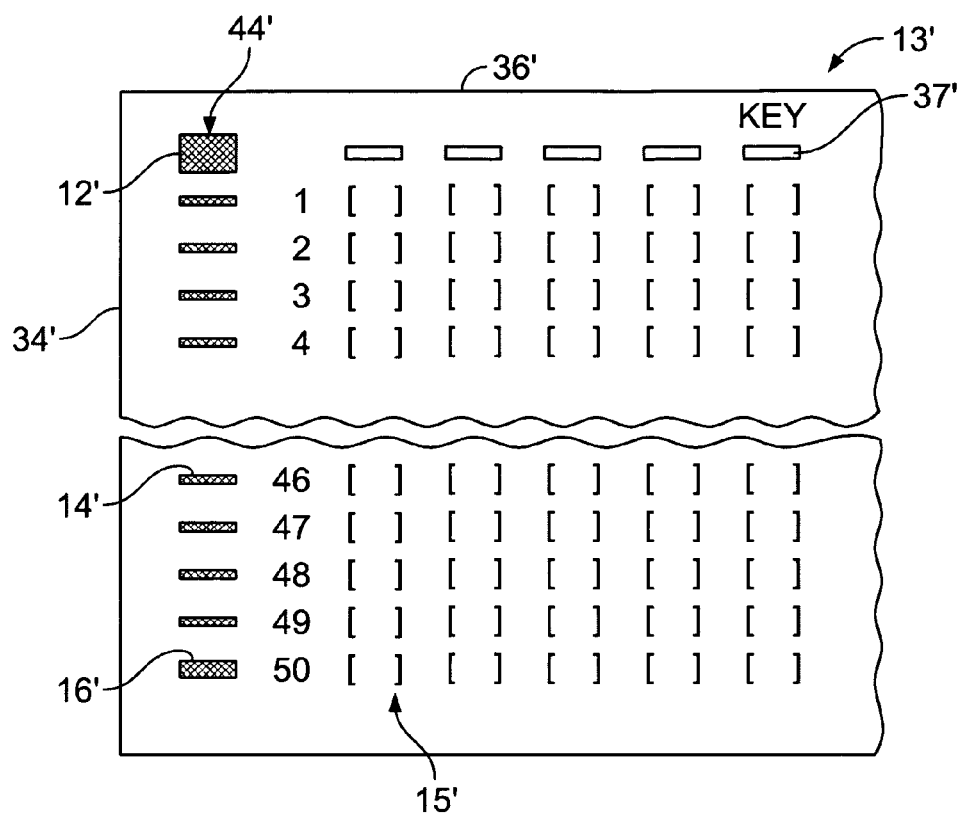
FIG. 1 shows a conventional scannable form having a horizontal format.

FIG. 1 shows a conventional scannable form 13' having a horizontal format marketed by Scantron Corporation of Irvine, Calif.

Figure 2:
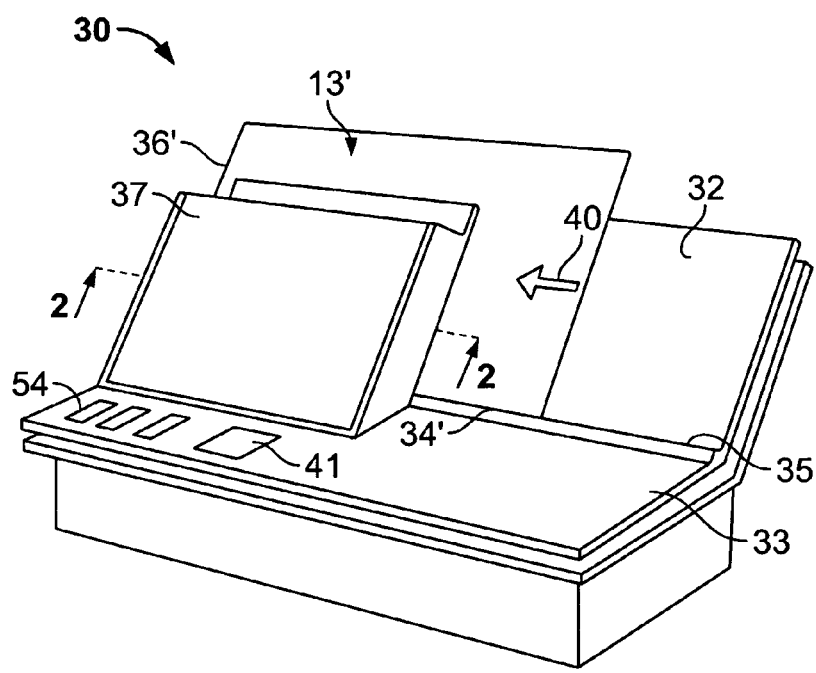
FIG. 2 is a perspective view of a form scanning apparatus.
Figure 3:
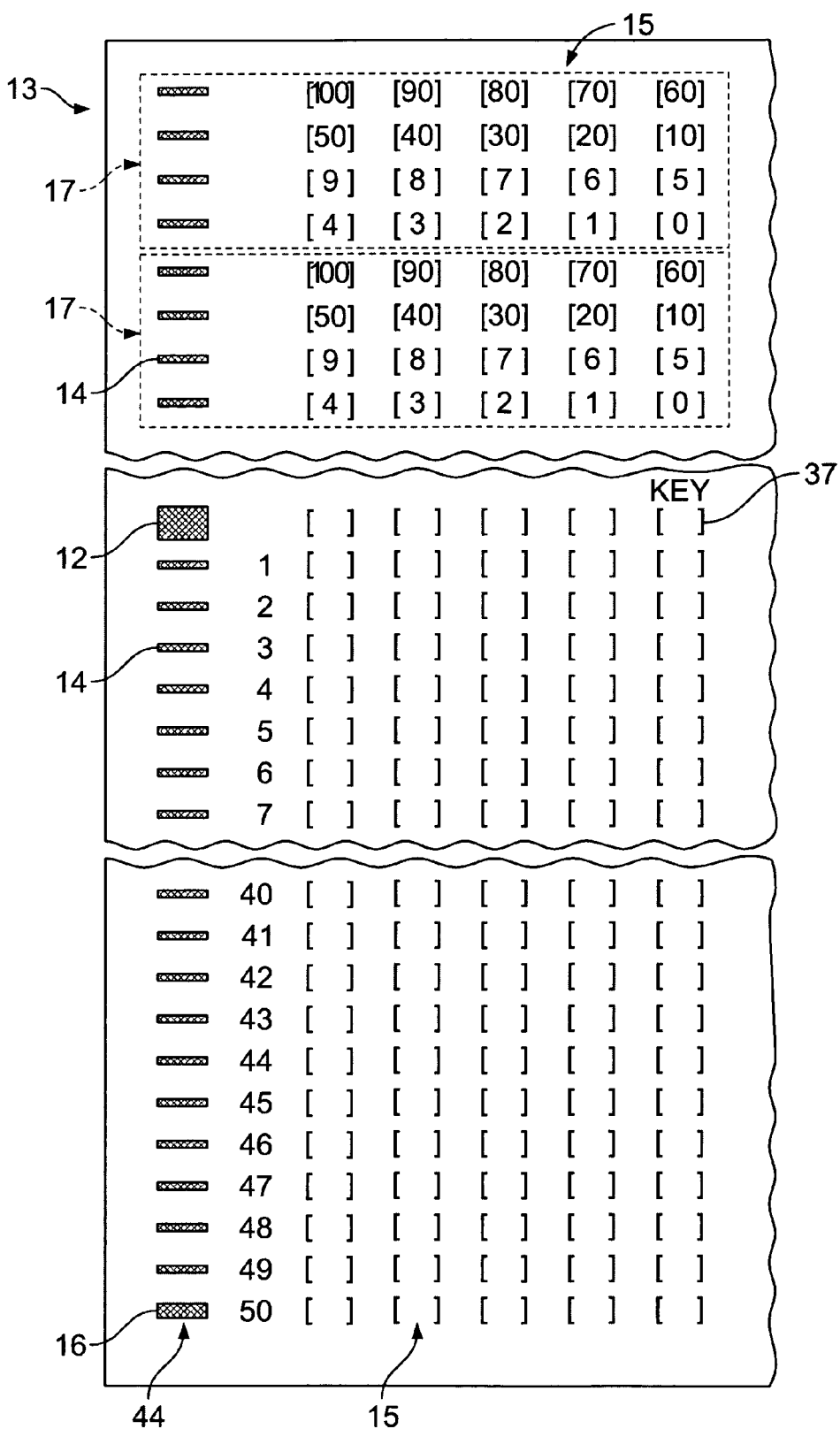
FIG. 3 shows a scannable form, having a horizontal format.
Figure 5:
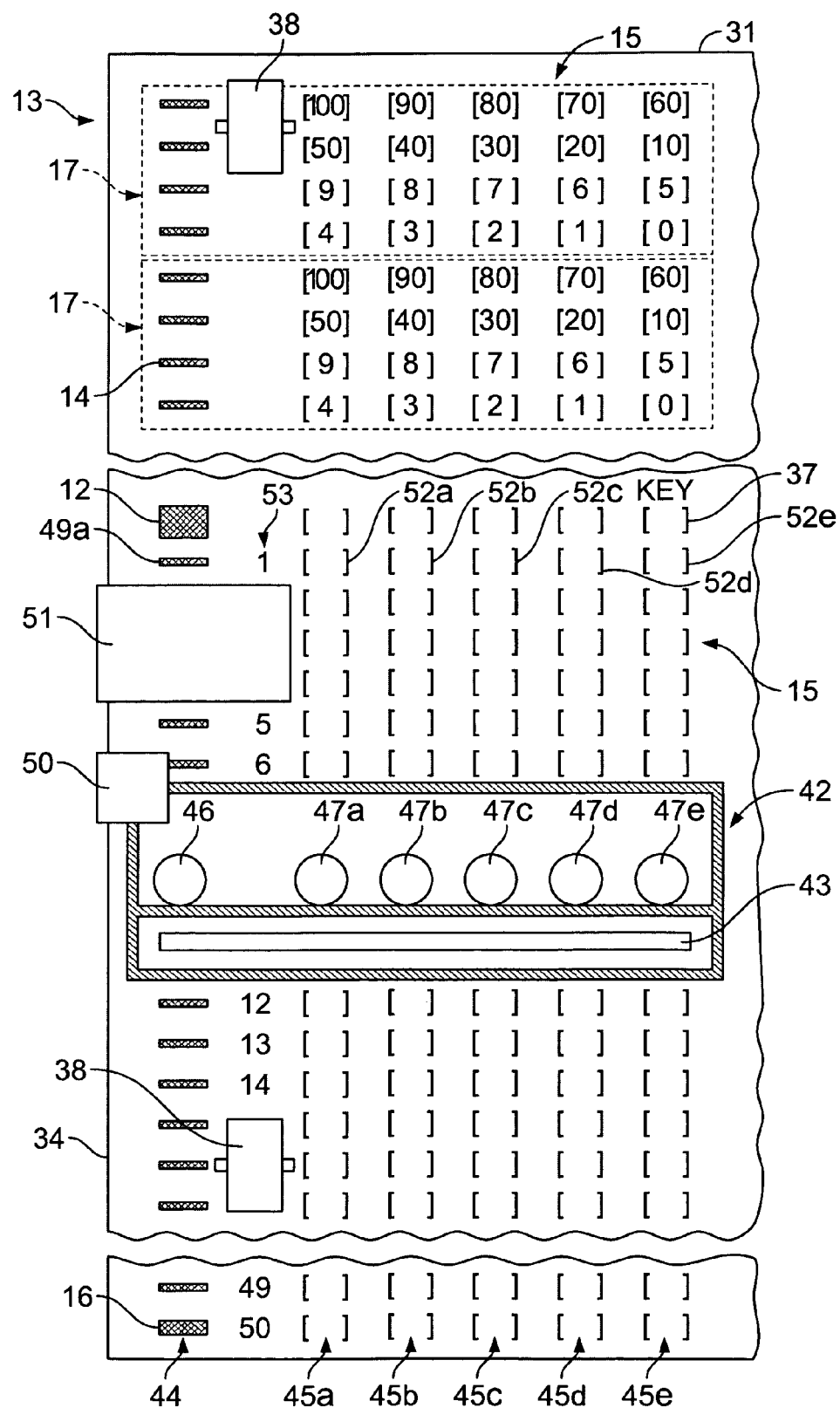
FIG. 5 shows the same mechanism as FIG. 4, as viewed along the line 3—3 thereof, with a scannable form.

FIG. 2 shows a form scanning apparatus 30 designed to scan a scannable form 13 (FIG. 3 and FIG. 5) having a horizontal format or a scannable form 70 (FIG. 6) having a vertical format. The scannable form 13 in FIGS. 3 and 5 is best understood with reference to the conventional Scantron-type scannable form 13' in FIG. 1 having a horizontal format.

As shown in FIG. 2, the conventional form 13' is placed face-up on a vertically inclined platen 32 provided on the apparatus housing 33. A longitudinal edge 34' of the form 13' rests on a ledge 35 at the bottom of the platen 32. The form leading edge 36' is inserted behind a reader housing 37 containing a pair of drive wheels 38, rotated by motor 39 (FIG. 4), which transports the form 13' at a predetermined rate in the direction of the arrow 40. As the form 13' is driven beneath the housing 37, each response is detected and marked. The total number of responses may appear on a display 41 and optionally may be printed on the form 13'. When the form 13 is used to score tests, the number of correct responses may be displayed and printed. Alternatively, the tallied responses may be recorded in electronic form for further processing by another machine, or transmitted (e.g., by modem) to a central computer.

As shown in FIG. 1, the Scantron-type scannable form of the prior art has a start-of-form mark 12', multiple response control marks 14', and an end-of-form mark 16'. These marks 12', 14' and 16' are aligned in a control mark column 44' which is parallel to the longitudinal form edge 34' of the form 13'. Detection of the start-of-form mark 12' by the form scanning apparatus 30 automatically initiates scanning of the form 13'. Each of the response control marks 14' is row aligned with one or more response spaces 15'. Responses are indicated by marking an opaque mark within a response space 15'.

If a test is being scored, detection of a response control mark 14' enables appropriate circuitry to compare a response entered in a response receiving space 15' aligned with that response control mark 14' with corresponding correct answer data stored in a memory. In other applications, responses entered in response spaces 15' are tallied. The end-of-form mark 16', the last mark in the control mark column 44', enables score or tally printout, or triggers data storage or transmission. Both the start-of-form mark 12' and the end-to-form mark 16' can act as response control marks. The present disclosure is not limited to use with forms having a start-of-form mark 12' and/or an end-of-form mark 16'.

Figure 4:
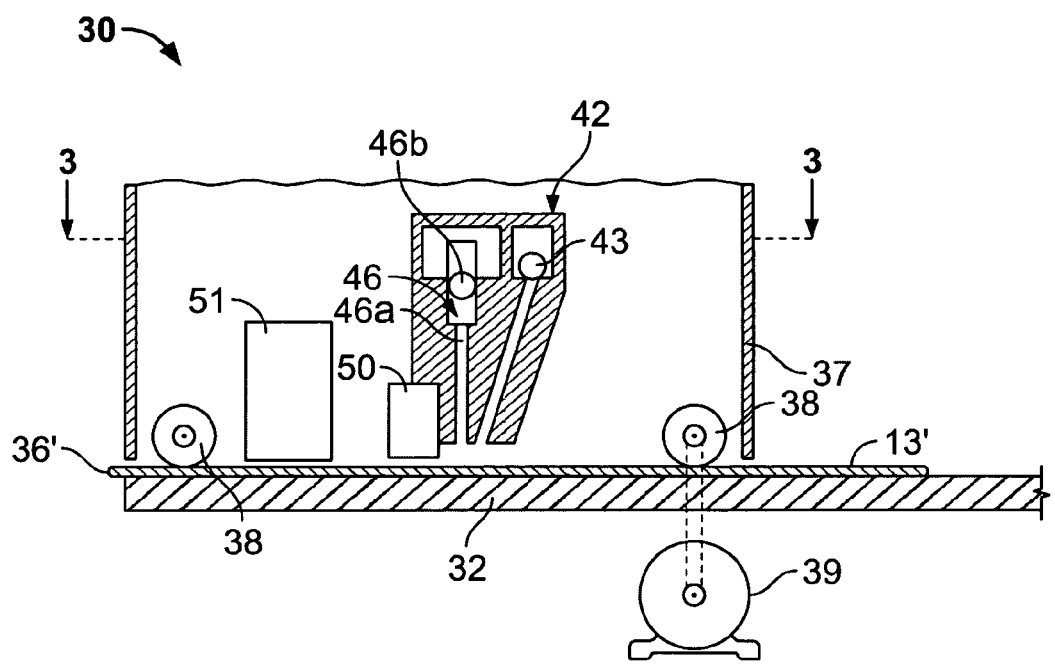
FIG. 4 is a diagrammatic view of one of the drive, sensing, error marking and tally printing mechanisms of the form scanning apparatus, all as seen along the line 2—2 of FIG. 2.

FIG. 4 shows a diagrammatic view of the form scanning apparatus 30 as seen along the line 2—2 of FIG. 2. To tally data, the form 13' is transported past a read station 42 containing a light source 43, which illuminates both the control mark column 44' and the response receiving spaces 15' of the form 13'. This may be referred to as optical mark recognition (OMR). The read station 42 also includes a control channel sensor 46 which detects control marks in the control mark column 44', and a plurality of data channel sensors 47a through 47e (FIG. 5) which detect responses in the spaces 15'.

The control channel sensor 46 may comprise a light guide 46a, a photosensor 46b, and an associated amplifier (not shown) which provides an output signal when a control mark is sensed by a reduction in the light level reflected from the form 13'. Similarly, the data channel sensors 47a-47e each may comprise a light guide, a photosensor, and an associated amplifier providing respective, parallel outputs. The data channel sensors 47a-47e are row aligned with the control channel sensor 46.

The scanning apparatus may also include an error marking device 50 for marking erroneous responses, and a score printer 51.

FIG. 3 shows the scannable form 13 of the present disclosure having a horizontal format. If used with a Scantron-type scanner, the form 13 has a start-of-form mark 12 and an end-of-form mark 16 in a control mark column 44. However, the form 13 has response control marks 14 both above and below the start-of-form mark 12. Shown above the start-of-form mark 12 are multiple numeric value blocks 17 which each contain a number of response control marks 14 and associated row aligned response receiving spaces 15.

In a preferred configuration, the numeric value blocks 17 are located above the start-of-form mark 12. However, the numeric value blocks 17 can be located below the start-of-form mark 12 or in any location within the bounds of the form 13. As explained below, numeric values can be entered in each of the numeric value blocks 17. Below the start-of-form mark 12 are multiple rows of response control marks 14 with their associated row aligned response receiving spaces 15. These response control marks 14 allow a user to enter answers to test questions in scholastic tests, tally information in inventory control, or the input of other types of data.

Figure 3A:
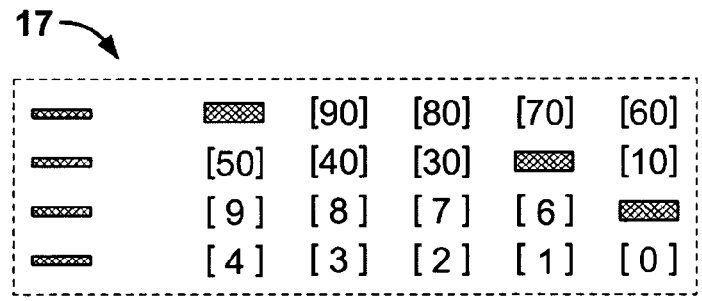
FIG. 3a is an example of a numeric value input for a numeric value block of the scannable form.

In each numeric value block 17, each response receiving space 15 is marked with a number which determines the weighting for that response receiving space 15. The response receiving spaces 15 in each numeric value block 17 are added according to the weighting factors in order to obtain a sum representing an associated numeric value for the numeric value block 17. For example, if the response receiving spaces 15 of the numeric value block 17 are marked in FIG. 3a with weights of "100", "20", and "5". Thus, the numeric value associated with the block 17 is "125".

The form scanning apparatus 30 is programmed to interpret the opaque marks in a numeric value block 17 of the form 13 as a numeric value by marking the corresponding numeric value block 17 on a "key" sheet. The "key" sheet allows entry of this numeric value block 17 information and other information including the appropriate responses for other response receiving spaces 15 and the type of result reporting that is desired. In addition to marking the "key" sheet, a program switch 54 on the form scanning apparatus 30 should be momentarily closed before feeding the "key" sheet into the apparatus 30. If the program switch 54 is not closed, data entry is inhibited even though a "key" sheet is present. In a preferred configuration, the "key" sheet is identified by marking the key space 37, which is the response receiving space 15 that is farthest from the start-of-form mark 12 in the row containing the start-of-form mark 12.

The numeric value marked by the operator on the "key" sheet both allows a numeric value to be entered in the associated numeric value block 17 on a form 13 and assigns a maximum value to this numeric value. Each numeric value maximum from the "key" sheet is stored in an addressable memory. If the numeric value maximum for any numeric value block 17 is present on the "key" sheet, the form scanning apparatus 30 is conditioned to read the associated response receiving spaces 15 for that numeric value block 17 on the form 13 being scanned in order to obtain the numeric value input. If no numeric value maximum is marked on the "key" sheet for a numeric value block 17, the form scanning apparatus 30 is conditioned not to read the response receiving spaces 15 for the associated numeric value block 17 on the form 13 being scanned.

For example, where an educator is administering both a multiple choice test and a related test, such as an essay, the educator would mark the numeric value block 17 on the "key" sheet with the numeric value maximum, which is the total possible points for the related test. Thus, the form scanning apparatus 30 would be conditioned to read the response receiving spaces 15 for the associated numeric value block 17 on the form 13 being scanned to obtain the numeric value input for that form 13. If the educator is not administering a related test, the numeric value block 17 on the "key" sheet would not be marked, and the form scanning apparatus 30 would not read response receiving spaces 15 for the associated numeric value block 17 on the form 13 being scanned. If a numeric value input from the form 13 being scanned is more than the associated numeric value maximum, an error condition exists. The form scanning apparatus 30 can be programmed to handle error conditions in different ways.

The remaining response receiving spaces 15 allows entry of question or tally responses. On a form 13 with a horizontal format, each response is marked in a response receiving space 15 aligned with a response control mark 14. When the form 13 is used for testing purposes, correct responses are received from the "key" sheet and are stored in the addressable memory along with any maximum numeric values. When such a form 13 is read by the form scanning apparatus 30, the absence of a "key" mark automatically conditions the form scanning apparatus 30 not to store new correct responses.

In a testing mode, the form scanning apparatus 30 compares each entered response to the response read-in from the "key" sheet and obtains a correct response sum. If the form 13 that is scanned has response receiving spaces 15 on both sides of the sheet, the apparatus 30 will add to correct responses on both sides of the sheet to obtain the correct response sum. In a preferred configuration, each numeric value input for a numeric value block 17 that has an associated maximum value on the "key" sheet is added to this response sum to obtain a total. For example, where an educator has administered both a multiple choice and a related test, the correct response sum, corresponding to the total correct answers for the multiple choice test, is added to the numeric value input, corresponding to the score from the related test, to obtain a total overall score for the two tests.

Alternatively, the scannable form 13 or the form scanning apparatus 30 can include one or more function inputs for indicating the appropriate mathematical function to be performed using the correct response sum and the numeric value input. For example, the form scanning apparatus 30 could include one or more input switches to allow the operator of the apparatus 30 to indicate the appropriate mathematic function to be performed or the form 30 could include one or more response receiving spaces 15 for the "key" sheet to indicate the mathematic function. The mathematical function to be performed can include, but is not limited to, addition, subtraction, multiplication, division, or a combustion thereof. For example, a numeric value input entered into a numeric value block 17 can be used as a multiplication weighting factor, so that each student taking a test can be individually considered to take into account skill or age level, previous times tested, etc. A weighting factor can also be used to weight wrong answers differently from right answers, to penalize guessing. Further, different numeric value blocks 17 can be used on one form to indicate that associated questions are to be weighted differently from other questions.

In a non-testing or tallying mode, a "key" sheet need not define correct responses, but would instead define categories and multiple response values. For example, if a form 13 is used for inventory control, each response control mark 14 can be defined to represent a particular inventory item, and the response spaces 15 can be defined as inventory counts or ranges. When the form 13 is scanned, marks in the response spaces 15 are tallied for each inventory item.

Considerable flexibility is permitted with respect to how many of the response controls marks 14 and associated response spaces 15 on a form 13 are actually used. That is, fewer question or tally response or numeric value inputs may be needed than are available on a pre-printed form. If no response or numeric value is stored in the memory location associated with a particular response control mark 14 when the "key" sheet is read-in, that response or numeric value is ignored when the form 13 is scanned. Furthermore, the present disclosure permits multiple sheet forms 13 to be used. Page marks or other means may be used to indicate which page of the form 13 is currently being scanned.

The numeric value blocks 17 operate identically with either form 13 having a horizontal format, or form 70 having a vertical format. However, the scanning of the tally or question responses is different with each format. FIG. 5 shows the form scanning apparatus 30 as viewed along the line 3—3 of FIG. 4, with a scannable form 13, having a horizontal data format. With a horizontal format, a single response control mark 14 is associated with each tally item or question. The tally items or questions themselves may be identified by numbers printed in a column 53.

For each tally item or question on the form 13, one or more (here, five) response receiving spaces 15 are row aligned with the corresponding response control mark 14. Thus, for item 1 of FIG. 5, the response receiving spaces 52*a*-52*e* are aligned with the response control mark 49*a*. To respond to item 1, an opaque mark is entered in one of the response spaces 52*a*-52*e* corresponding to the selected response. Such response marks are detected by the control channel sensors 47*a*-47*e* which are positioned over the respective response columns 45*a*-45*e*.

Figure 6:
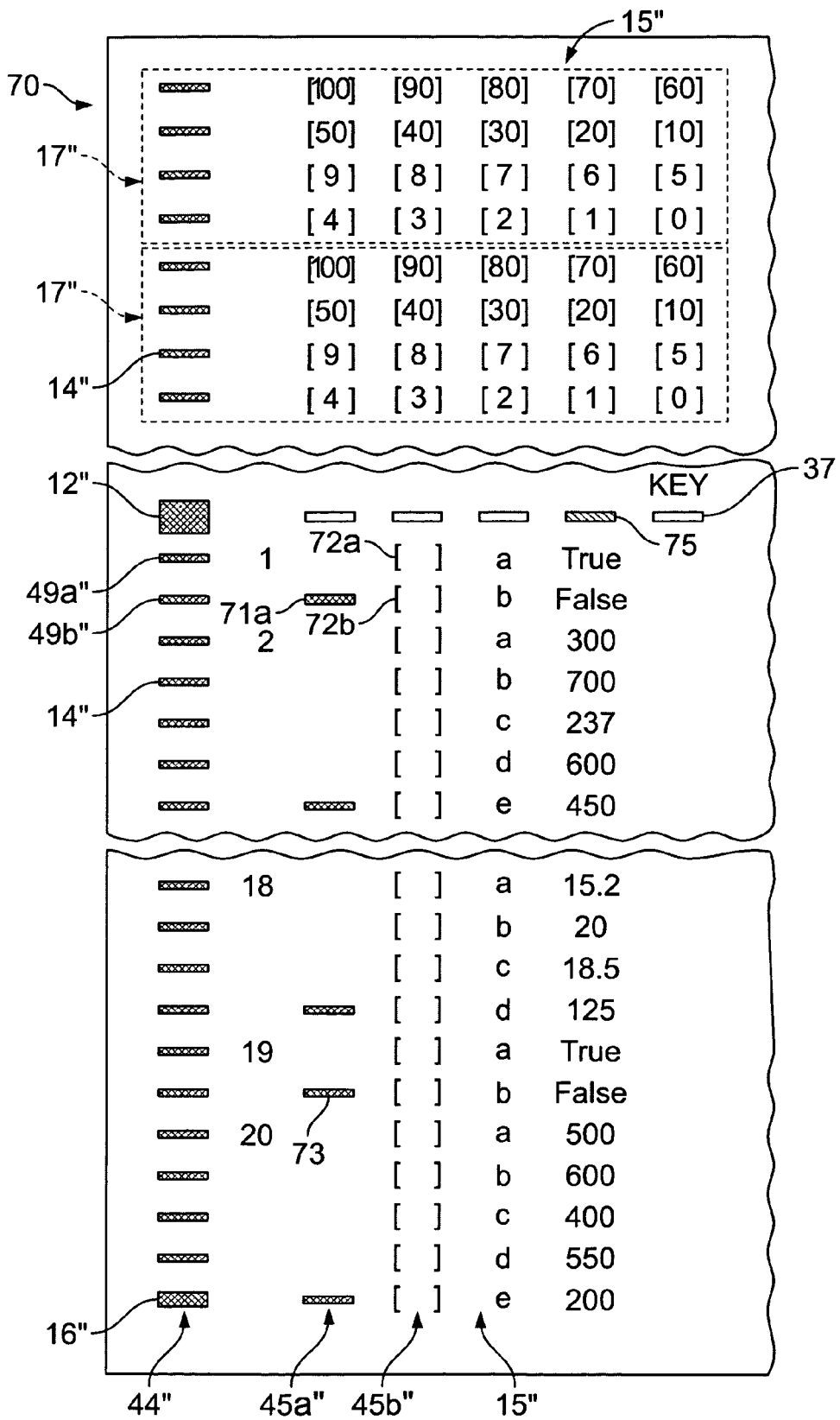
FIG. 6 shows a scannable form, having a vertical format.

In the vertical format of FIG. 6, the scannable form 70 has a control mark column 44" like that of the form 13 in FIG. 5. However, several response control marks 14" are associated with each item or question. The response receiving spaces 15" all are situated in a single column 45*b*" detected by the data channel sensor 47*b*. End-of-item marks 73 may be provided in a column 45*a*" aligned with the sensor 47*a* to indicate the end of each item or question. Thus, in FIG. 6, question #1 includes two response receiving spaces 72*a* and 72*b* row aligned with the respective answer control marks 49*a*" and 49*b*". An end-of-item mark 71*a* aligned with the response control mark 49*b*" indicates that the response space 72*b* is the last response space associated with question #1.

The scanning apparatus 30 scans the form 70 having a vertical format in a manner similar to that for the form 13 having a horizontal format. In the preferred configuration, the circuitry of the apparatus 30 is enabled to scan the vertical format by detecting a vertical space 75 that has been marked with an opaque mark. The vertical space 75 is row aligned with the start-of-form mark 12" and column aligned for detection by the data channel sensor 47*d*. Absence of a marked vertical space 75, as on the form 13, causes the apparatus 30 to score or tally in the horizontal mode. Of course, other means, such as a manual switch, may be used to enable the scanning apparatus 30 to score or tally in one or the other of these modes.

Provisions are made for the form scanning apparatus 30 to mark on the form 13 or the form 70 each incorrect response, the correct response next to the incorrect response, the total number of correct responses, the percentage of correct responses, the total number of incorrect responses, the result obtained from the operation of the numeric value input on the total of the correct responses, and the average of this result. Other types of responses may be provided as necessary for particular applications. For example, the form scanning apparatus 30 may provide for printing a roster of scores on a sheet used to post such scores.

The form scanning apparatus 30 can print the marks on the bottom of the first side of the form 13 or the form 70, or on the second side of a two-sided form 13 or form 70. The apparatus 30 may also operate in a "re-scan" mode where the marks to be printed on the form 13 or the form 70 are offset. In this mode, a form 13 or a form 70 can be scanned a second time, such as after a confusing question has been eliminated.

Bar Codes, OCR and ICR

Figure 7A:
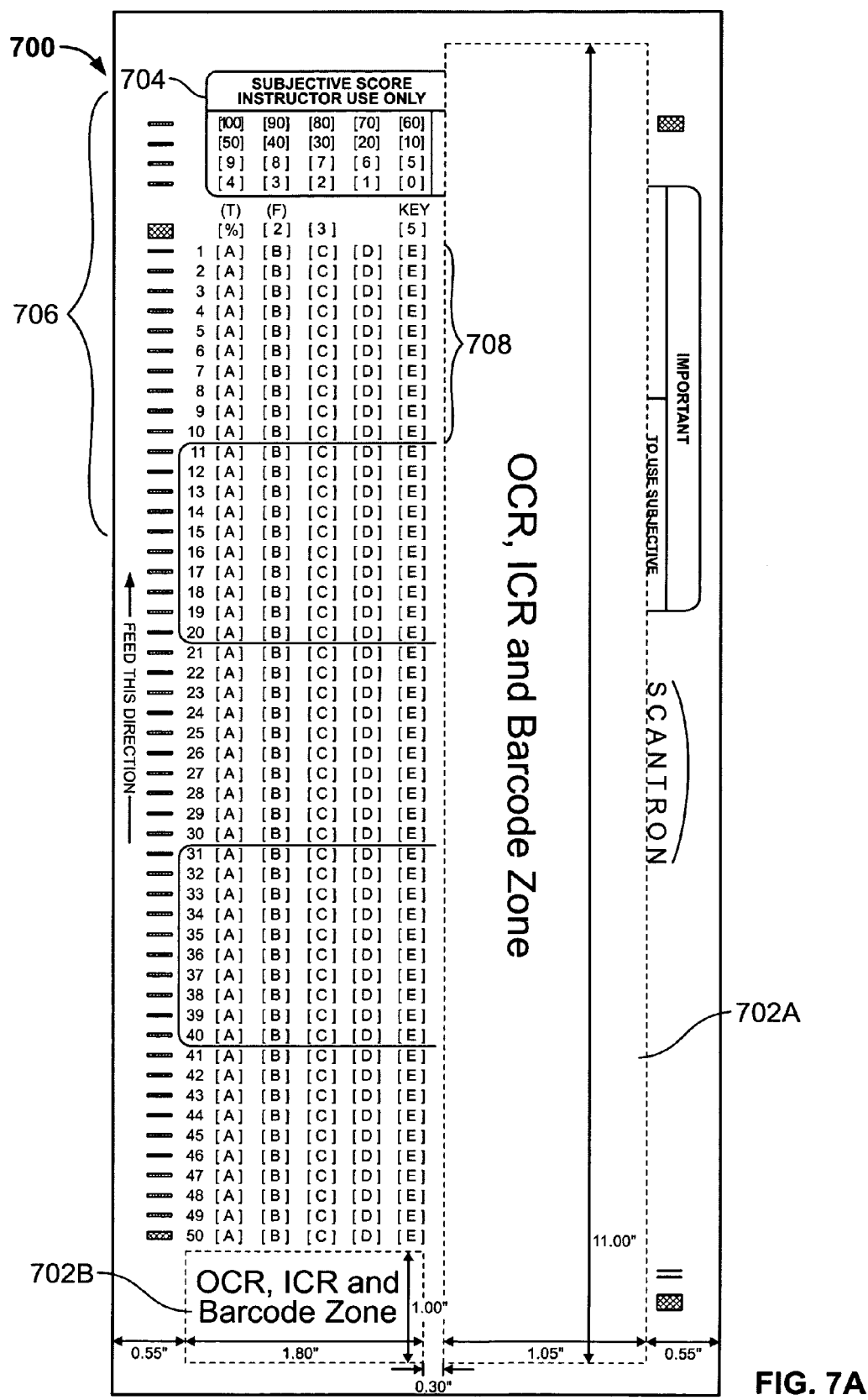
FIG. 7A shows a front side of a scannable form with a numeric value block, a plurality of response control marks, response receiving rows, and zones for printing a bar code, optical character recognition (OCR) spaces and/or intelligence character recognition (ICR) spaces.

FIG. 7A shows a front side of a scannable form 700 with a numeric value block 704, a plurality of response control marks 706, response receiving rows 708, and zones 702A, 702B for printing a bar code (e.g., FIGS. 8A-8B), optical character recognition (OCR) spaces (e.g., FIG. 9) and/or intelligence character recognition (ICR) spaces. The zones 702A, 702B have been selectively positioned to avoid interfering with handwritten marks in the rows of response receiving spaces 708 and provide a sufficient margin of error for printing, paper placement, etc. For example, if a bar code is placed too close to one or more response receiving rows 708 and/or the form 700 is not properly aligned with a scanner, the scanner may detect a false mark or a scanning error. The zones 702A, 702B may also be spaced from the edges of the form 700 to ensure that the bar code, OCR spaces and/or ICR spaces are properly printed on the form 700 with a margin for error.

A bar code (e.g., element 802 in FIG. 8A) may be assigned to a scannable form with a particular arrangement of control marks, response receiving spaces and other items. The bar code may have a number of uses, such as allowing retailers (e.g., school book stores) at a point-of-sale to assign their own price for each scannable form and track the number of scannable forms sold or remaining in the store as inventory. A bar code scanner may scan the bar code and output price and product information for display. The bar code scanner may be separate and located at different locations from the scanner of FIGS. 2 and 4. The bar code may be limited in size and cannot be enlarged or reduced in size on the form 700. Thus, a position of the bar code on the scannable form 700 may be important.

A user can write alphanumeric characters in OCR spaces (e.g., FIG. 9), which can be read by a scanner and recognized by a software application. A machine can digitally print or type (machine written) alphanumeric characters in ICR spaces, which can be read by a scanner. OCR and ICR marks do not have to be in boxes as in FIG. 9. The area for OCR and ICR marks may be defined by the form definition, which may be stored in the scanner memory. However, the accuracy of OCR and ICR recognition is greatly increased when using the designated boxes (e.g., FIG. 9) because the boxes identify the exact point to write (for OCR) or print (for ICR), which the scanner has been defined to read.

Figure 7B:
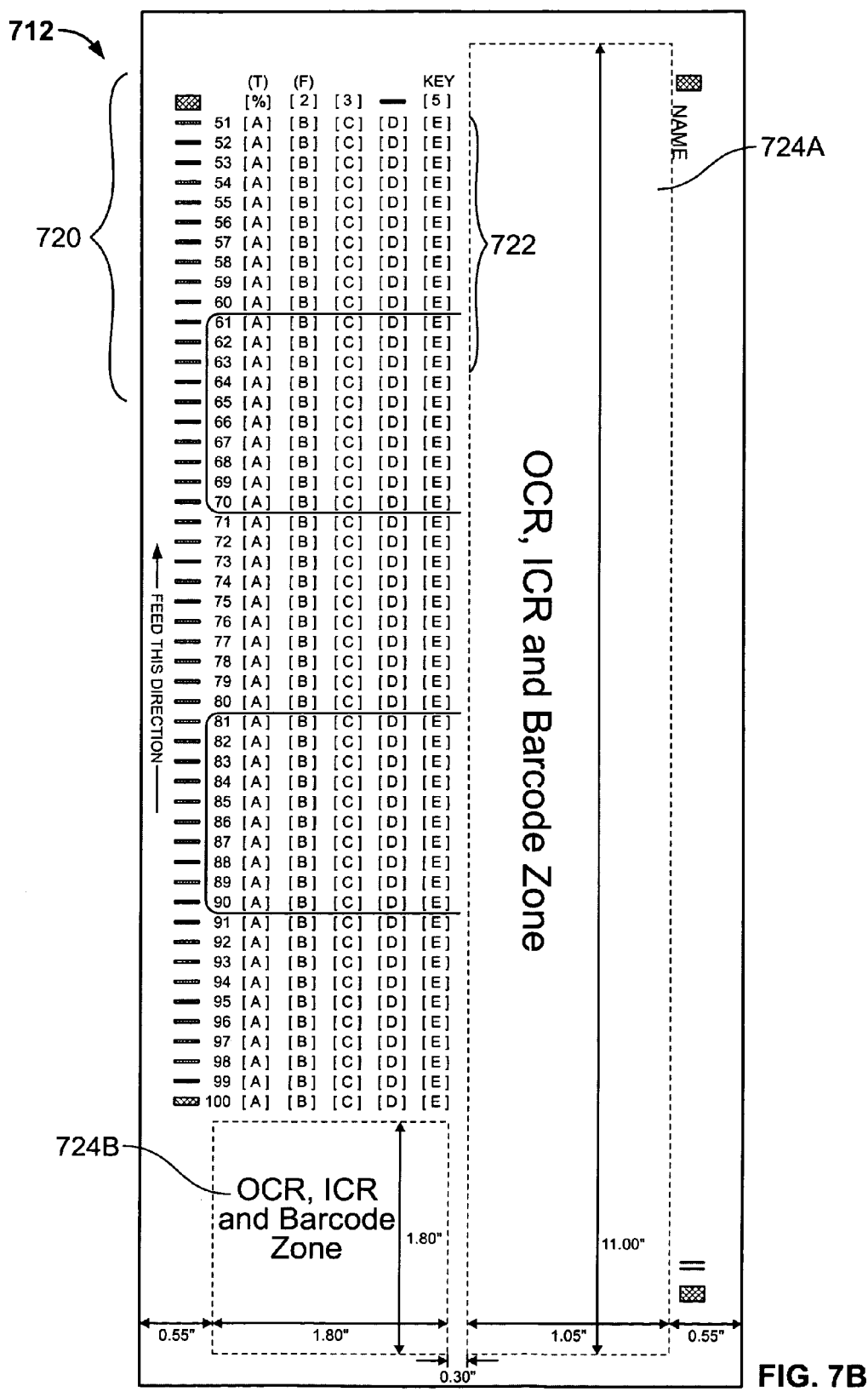
FIG. 7B shows a back side of a scannable form with a plurality of response control marks, response receiving rows, and zones for a bar code, optical character recognition (OCR) spaces and/or intelligence character recognition (ICR) spaces.

FIG. 7B shows a back side of a scannable form 712 with a plurality of response control marks 720, response receiving rows 722, and zones 724A, 724B for a bar code, optical character recognition (OCR) spaces and/or intelligence character recognition (ICR) spaces. The back side in FIG. 7B may be the back side of the form 700 in FIG. 7A or another form.

Figure 7C:
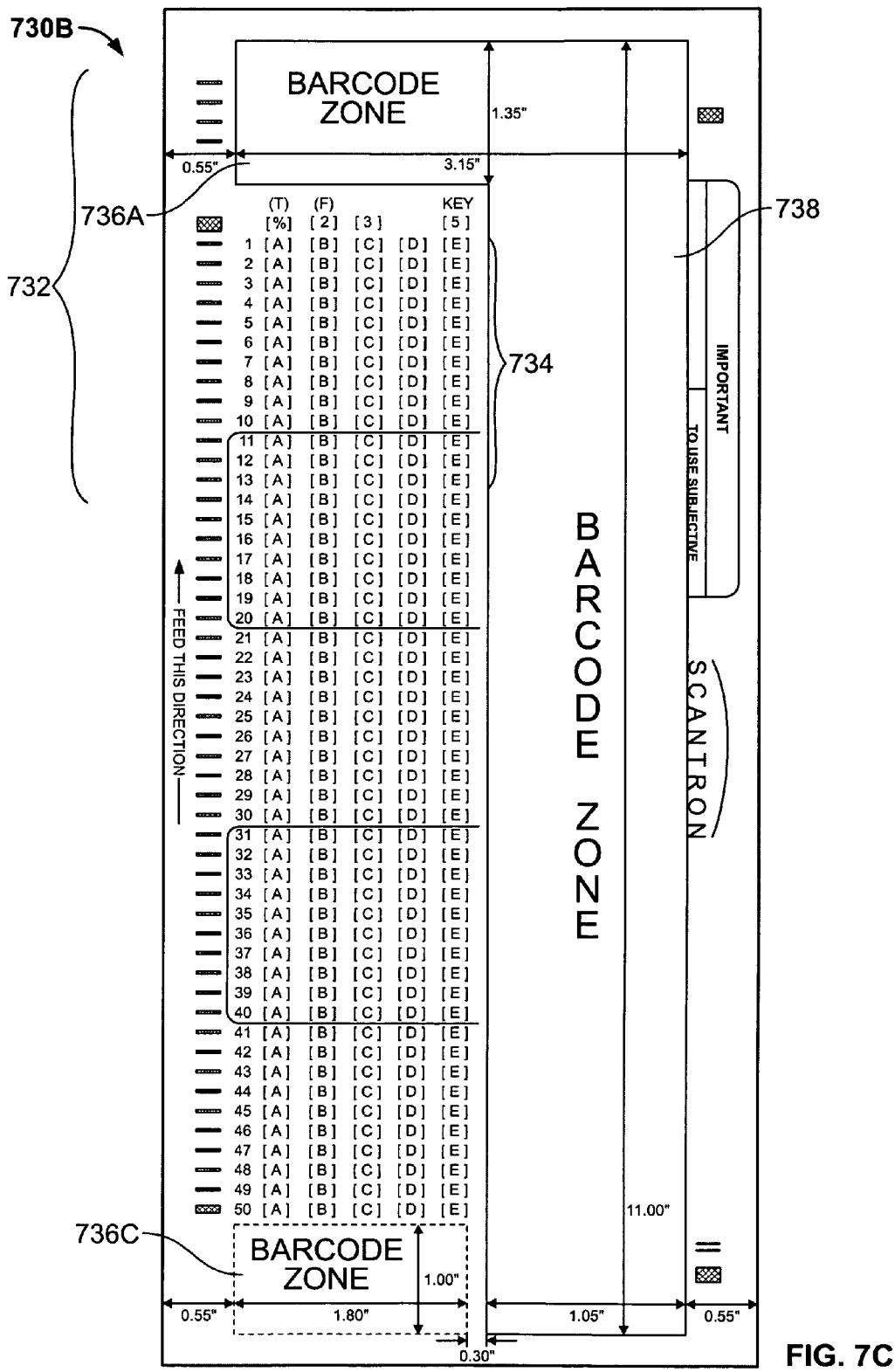
FIG. 7C shows a front side of a scannable form with a plurality of response control marks, response receiving rows, and zones for a bar code, optical character recognition (OCR) spaces and/or intelligence character recognition (ICR) spaces.

FIG. 7C shows a front side of a scannable form 730 with a plurality of response control marks 732, response receiving rows 734, and zones 736A, 736B, 736C for a bar code, optical character recognition (OCR) spaces and/or intelligence character recognition (ICR) spaces. Zone 736A replaces the numeric value box 704 in FIG. 7A.

Figure 8A:
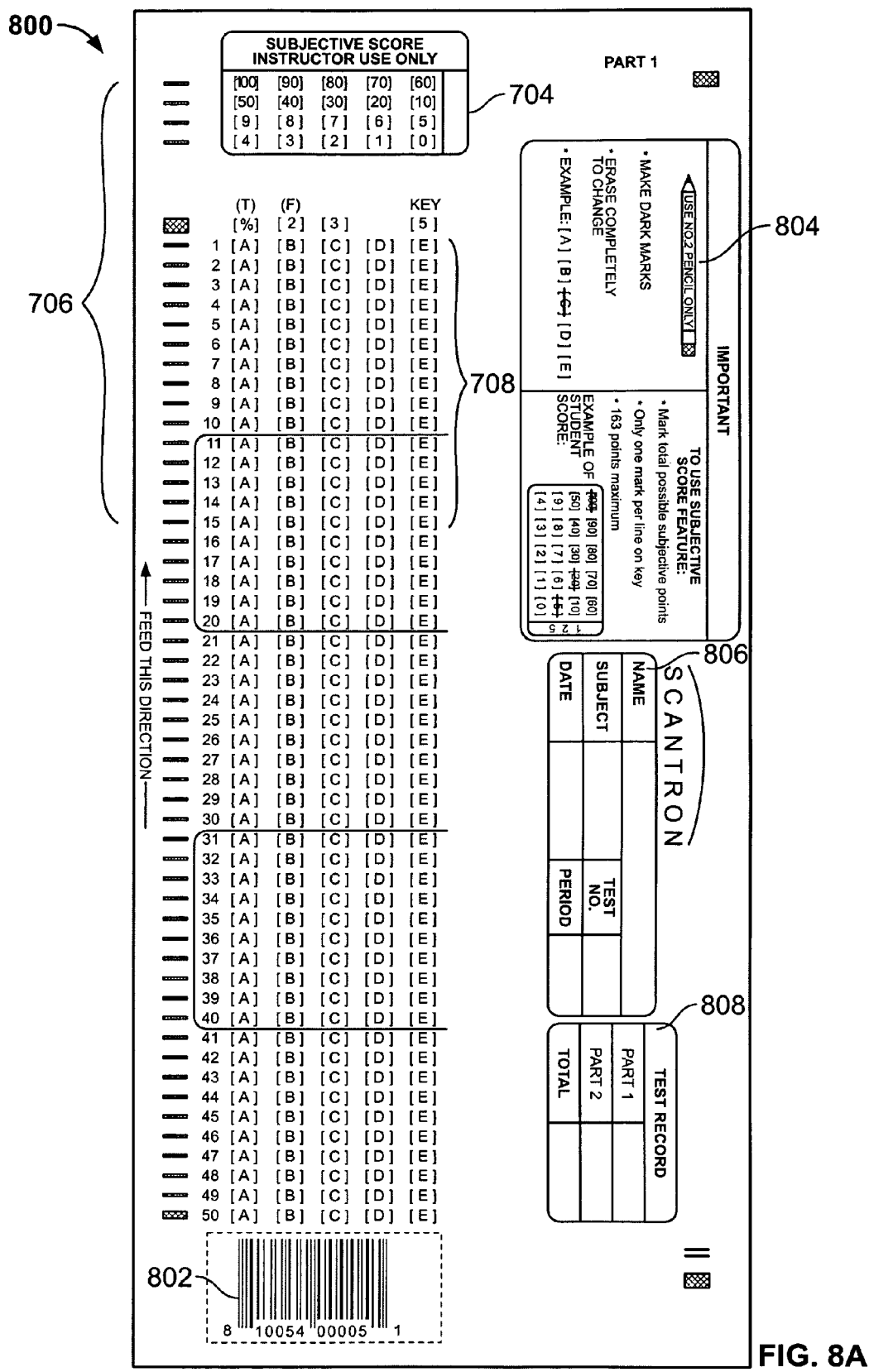
FIG. 8A shows a front side of a scannable form with a numeric value block, a plurality of response control marks, response receiving rows, and a bar code.

FIG. 8A shows a front side of a scannable form 800 with a numeric value block 704, a plurality of response control marks 706, response receiving rows 708, an instruction box 804, user information fields 806, a test scoring record 808 and a bar code 802. FIG. 8A illustrates an example of where a bar code 802 may be in the zones 702A, 702B in FIG. 7A without interfering with handwritten marks in the rows of response receiving spaces 708 and provide a sufficient margin of error. The bar code 802 may be a Uniform Product Code (UPC).

Figure 8B:
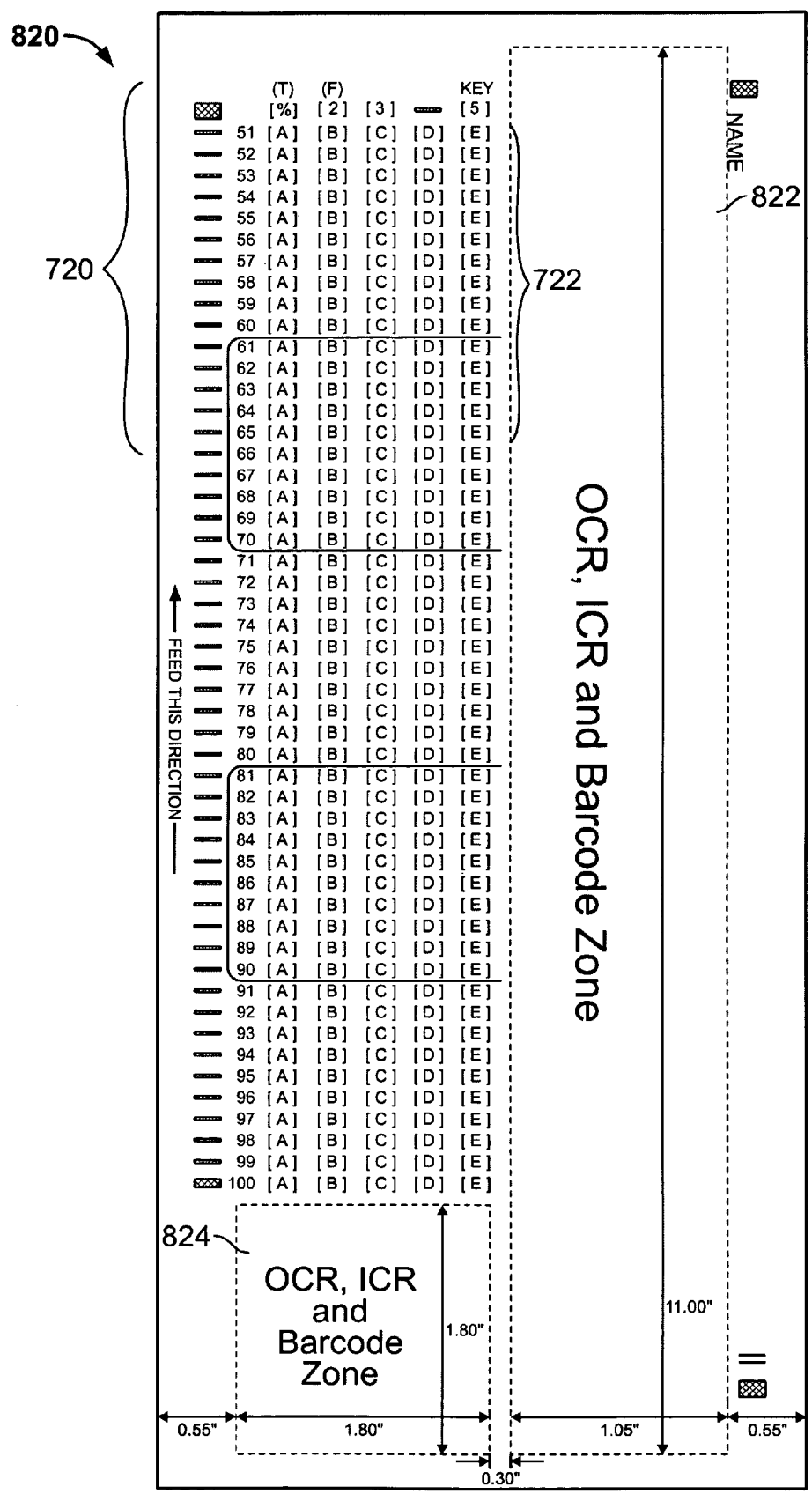
FIG. 8B shows a back side of a scannable form with a plurality of response control marks, response receiving rows, and a bar code.

FIG. 8B shows a back side of a scannable form 820 with a plurality of response control marks 720, response receiving rows 722, a name field 822 and a bar code 824. The back side in FIG. 8B may be the back side of the form 800 in FIG. 8A or another form.

Figure 9:
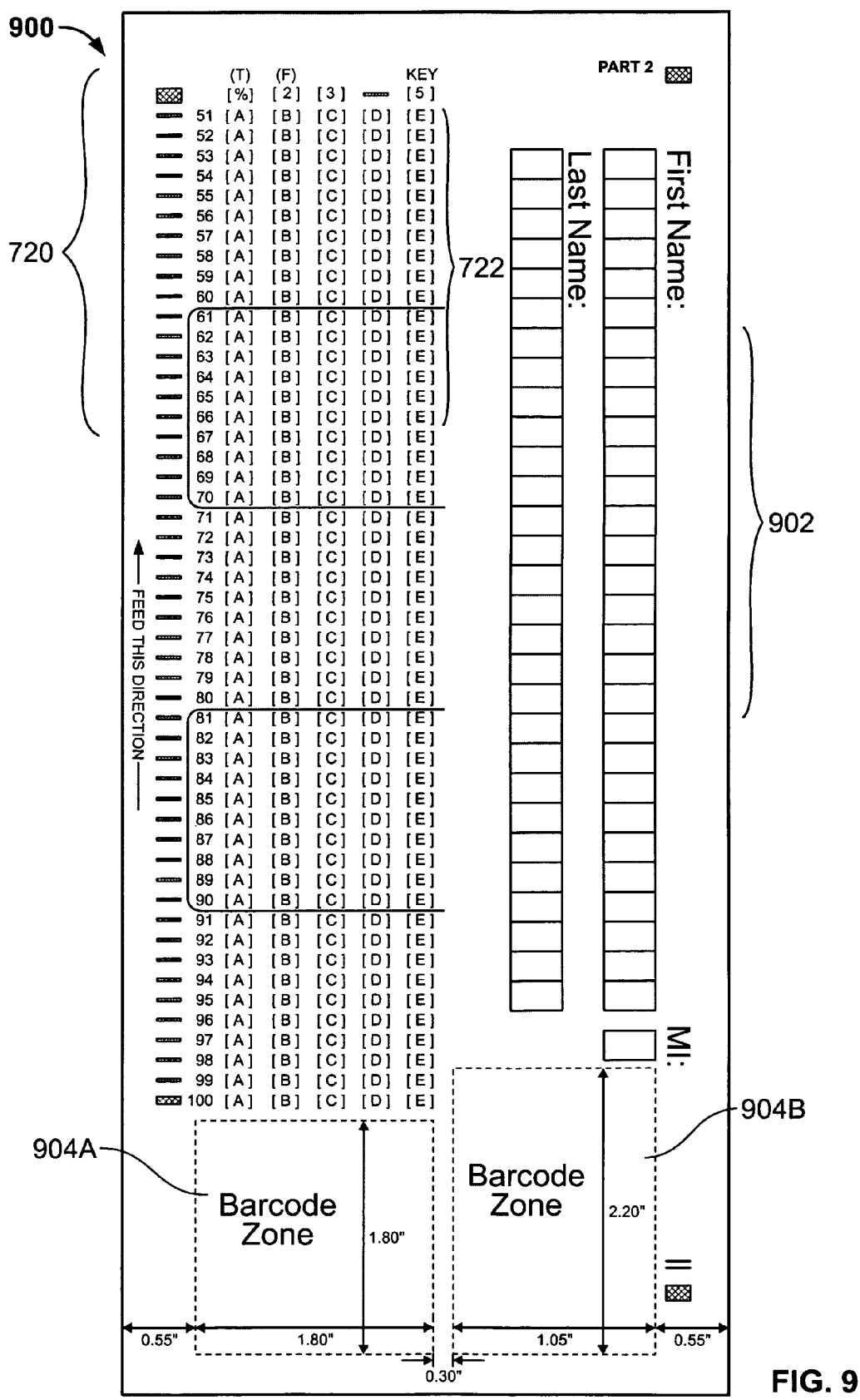
FIG. 9 shows a back side of a scannable form with a plurality of response control marks, response receiving rows, a plurality of optical character recognition (OCR) spaces for a user name and zones for a bar code, OCR spaces and/or intelligence character recognition (ICR) spaces.

FIG. 9 shows a back side of a scannable form 900 with a plurality of response control marks 720, response receiving rows 722, a plurality of OCR or ICR spaces 902 for a user name and zones 904A, 904B for a bar code, OCR spaces and/or ICR spaces. There may be any number of desired OCR/ICR spaces 902 for a user to handwrite or type a user name, a signature, a user identification, a user social security number, a date, a class section, and/or a test or survey administrator name.

The forms described above may be scanned by Test Scoring Machines or other 6-channel scanners available from Scantron.

A number of aspects have been described. Nevertheless, it will be understood that various modifications may be made. Accordingly, the disclosure is not to be limited by the specific illustrated configuration, but only by the scope of the appended claims. Other aspects are within the scope of the following claims.

What is claimed is:

1. A scannable form comprising:
   a. an elongate rectangular shape with first and second substantially straight longitudinal edges;
   b. at least two response columns parallel to the first longitudinal edge;
   c. a control mark column, parallel to the first longitudinal edge and parallel to the response column but spaced therefrom, the control mark column containing, in a direction parallel to the first longitudinal edge:
      (1) a first set of response control marks having a first length;
      (2) a second set of response control marks having the first length;
      (3) a start-of-form mark having a second length different from the first length; and
      (4) an end-of-form mark having a third length different from the first length and the second length;
      the first set of response control marks being column aligned with the start-of-form mark and before the second set of response control marks, the start-of-form mark being column aligned before the second set of response control marks, and the second set of response control marks being column aligned before the end-of-form mark;
   d. a response row corresponding to each response control mark, each response row being row aligned with the corresponding response control mark perpendicular to the first longitudinal edge, each response row containing at least two response receiving spaces, and each response receiving space being aligned in one of said response columns, the first set of response control marks being associated with response rows that have numeric value response receiving spaces; and
   e. a bar code in at least one of a first location and a second location, the first location being a first pre-determined distance below the end-of-form mark and a second pre-determined distance above a bottom edge of the form, the second location being a third pre-determined distance from at least one response row and a fourth pre-determined distance from one of the first and second longitudinal edges, the bar code being sufficiently spaced away from the response rows to avoid false detection of marks in the response rows, wherein the bar code on the scannable form comprises point of sale information.

2. The form of claim 1, wherein user written marks in the response receiving spaces are scannable by a first device, and the bar code is scannable by a second device.

3. The form of claim 1, further comprising a back side with a plurality of response control marks, response rows parallel to the response control marks, and an end-of-form mark, wherein said first location and second location of the bar code are on the back side of the form.

4. The form of claim 1, wherein user written marks in the response receiving spaces are scannable by a optical mark recognition (OMR) scanner.

5. The form of claim 1, further comprising at least one optical character recognition (OCR) space designated for a user handwritten character, the optical character recognition space being located in at least one of the first and second locations.

6. The form of claim 5, wherein the at least one optical character recognition (OCR) space is located on a back side of the form.

7. The form of claim 5 having a plurality of optical character recognition (OCR) spaces for a user to handwrite at least one of a user name, a user identification, a user social security number, a date, a class section, and an administrator name.

8. The form of claim 1, further comprising at least one intelligence character recognition (ICR) space designated for a machine written character, the ICR space being located in at least one of the first and second locations.

9. The form of claim 1, wherein each response row associated with the response control marks of the second set of response control marks contains a plurality of response receiving spaces designated to correspond to selectable answers of a multiple choice question.

10. The form of claim 1, wherein the first, second and third lengths are measured in a direction parallel to the first longitudinal edge, and the start-of-form mark is longer than the end-of-form mark, and the end-of-form mark is longer than the response control marks.

11. The form of claim 1, wherein each numeric value response receiving space corresponds to a different numeric value.

12. The form of claim 11, wherein the numeric value for a numeric value block is designated to correspond to a sum of the numeric values of all selected response receiving spaces within the numeric value block.

13. The form of claim 12, further including a space for designating a form as a key form such that each numeric value of each numeric value block on the key form indicates that associated numeric value blocks on subsequent forms should contain a numeric value and indicates a maximum value for the associated numeric value.

14. The form of claim 13, further including a space for designating a mathematical operation to be performed between the numeric value of a numeric value block and the sum of the response receiving spaces.

15. The form of claim 14, wherein the designated mathematical operation is addition.

16. The form of claim 1, wherein each response row associated with the response control marks of the second set of response control marks contains one response receiving space in a corresponding response column, at least one group of successive response rows being allocated to correspond to selectable responses, and further comprising an end-of-response column parallel to the first longitudinal edge but spaced from both the control mark column and the response column and containing marks row aligned with the last response space associated with each group of response rows.

17. The form of claim 1, further comprising a set of mode indicating indicia row aligned with the start-of-form mark and column aligned with at least one of the response columns.

18. A form scanning system including:
   a. a scannable form having:
   (1) an elongate rectangular shape with first and second generally straight longitudinal edges;
   (2) at least two response columns parallel to the first longitudinal edge;
   (3) a control mark column, parallel to the first longitudinal edge and parallel to the response column but spaced therefrom, the control mark column containing, in a direction parallel to the first longitudinal edge:
      (i) a first set of response control marks;
      (ii) a second set of response control marks;
      (iii) a start-of-form mark; and
      (iv) an end-of-form mark;
      the first set of response control marks being column aligned with the start-of-form mark and before the second set of response control marks, the start-of-form mark being column aligned before the second set of response control marks, and the second set of response control marks being column aligned before the end-of-form mark;
   (4) a response row corresponding to each response control mark, each response row being row aligned with the corresponding response control mark perpendicular to the first longitudinal edge, each response row containing at least two response receiving spaces, and each response receiving space being aligned in one of response columns, the first set of response control marks being associated with response rows that have numeric value response receiving spaces; and
   (5) a bar code in at least one of a first location and a second location, the first location being a first pre-determined distance below the end-of-form mark and a second pre-determined distance above a bottom edge of the form, the second location being a third pre-determined distance from at least one response row and a fourth pre-determined distance from one of the first and second longitudinal edges, the bar code being sufficiently spaced away from the response rows to avoid false detection of marks in the response rows,
      wherein the bar code on the scannable form comprises point of sale information; and
   b. a scanning apparatus operable to detect response control marks on the scannable form and optically recognize marks in the response receiving spaces.

19. The form scanning system of claim 18, wherein the form further comprises a back side with a plurality of response control marks, response rows parallel to the response control marks, and an end-of-form mark, the scanning apparatus being operable to recognize marks in the response receiving spaces on both sides of the scannable form.

20. The form scanning system of claim 19, wherein the bar code is on the back side of the form at a pre-determined distance from at least one response row.

21. The form scanning system of claim 18, wherein at least one side of the form further comprises at least one optical character recognition (OCR) space designated for a user handwritten character, the optical character recognition space being located in at least one of the first and second locations, the scanning apparatus being operable to recognize the user handwritten character in the OCR space.

22. The form scanning system of claim 21, wherein at least one side of the form further comprises a plurality of optical character recognition (OCR) spaces for a user to handwrite at least one of a user name, a user identification, a user social security number, a date, a class section, and an administrator name.

23. The form scanning system of claim 18, wherein the form further comprises at least one intelligence character recognition (ICR) space designated for a machine written character, the ICR space being located in at least one of the first and second locations.

24. The form scanning system of claim 18, wherein the scanning apparatus interprets a mark in the numeric value response receiving spaces as a numeric value.

25. The form scanning system of claim 18, wherein the scanning apparatus is programmed by a key sheet to interpret the response rows associated with the first set of response control marks as a numeric value.

26. The form scanning system of claim 18, wherein the scanning apparatus is programmed to tally responses in the response rows associated with the second set of response control marks, and to mathematically combine the numeric value with the tally results.

27. The form scanning system of claim 18, wherein the scanning apparatus is programmed to mathematically combine the numeric value with selected responses in the response rows associated with the second set of response control marks.

28. A method of making a scannable form, the method comprising:
   printing on a form having an elongate rectangular shape with first and second substantially straight longitudinal edges:
   a. at least two response columns parallel to the first longitudinal edge;
   b. a control mark column, parallel to the first longitudinal edge and parallel to the response column but spaced therefrom, the control mark column containing, in a direction parallel to the first longitudinal edge:
      (1) a first set of response control marks having a first length;
      (2) a second set of response control marks having the first length;
      (3) a start-of-form mark having a second length different from the first length; and
      (4) an end-of-form mark having a third length different from the first length and the second length, the first set of response control marks being column aligned with the start-of-form mark and before the second set of response control marks, the start-of-form mark being column aligned before the second set of response control marks, and the second set of response control marks being column aligned before the end-of-form mark,
   c. a response row corresponding to each response control mark, each response row being row aligned with the corresponding response control mark perpendicular to the first longitudinal edge, each response row containing at least two response receiving spaces, and each response receiving space being aligned in one of said response columns, the first set of response control marks being associated with response rows that have numeric value response receiving spaces; and d. a bar code in at least one of a first location and a second location, the first location being a first pre-determined distance below the end-of-form mark and a second pre-determined distance above a bottom edge of the form, the second location being a third pre-determined distance from at least one response row and a fourth pre-determined distance from one of the first and second longitudinal edges, the bar code being sufficiently spaced away from the response rows to avoid false detection of marks in the response rows, wherein the bar code on the form comprises point of sale information.

29. The form of claim 1, wherein the bar code on the scannable form comprises information compatible for tracking a number of scannable forms sold or remaining in an inventory.

30. The form scanning system of claim 18, wherein the bar code on the scannable form comprises information for tracking a number of scannable forms sold or remaining in an inventory.

31. The method of claim 28, wherein the bar code on the form comprises information compatible for tracking a number of scannable forms sold or remaining in an inventory.

32. A scannable form comprising:
a. an elongate rectangular shape with first and second substantially straight longitudinal edges;
b. at least two response columns parallel to the first longitudinal edge;
c. a control mark column, parallel to the first longitudinal edge and parallel to the response columns but spaced therefrom, the control mark column containing, in a direction parallel to the first longitudinal edge:
   (1) a first set of response control marks having a first length;
   (2) a second set of response control marks having the first length;
   (3) a start-of-form mark having a second length different from the first length; and
   (4) an end-of-form mark having a third length different from the first length and the second length;
   the first set of response control marks being column aligned with the start-of-form mark and before the second set of response control marks, the start-of-form mark being column aligned before the second set of response control marks, and the second set of response control marks being column aligned before the end-of-form mark;
d. a response row corresponding to each response control mark, each response row being row aligned with the corresponding response control mark perpendicular to the first longitudinal edge, each response row containing at least two response receiving spaces, and each response receiving space being aligned in one of said response columns, the first set of response control marks being associated with response rows that have numeric value response receiving spaces;
e. a first bar code in a first location, the first location being a first pre-determined distance below the end-of-form mark, the first bar code being sufficiently spaced away from the response rows to avoid false detection of marks in the response rows; and
f. a bar code zone comprising a second bar code, the bar code zone being located in a direction parallel to the first longitudinal edge, the bar code zone being sufficiently spaced away from the first bar code to avoid false detection of bar code information, the bar code zone comprising:
   (1) a bottom end of the bar code zone, the bottom end of the bar code zone being located above a bottom edge of the form, the bottom end being a third pre-determined distance from at least one response row, the bottom end of the bar code zone being below the end-of-form mark and sufficiently spaced away from the response rows to avoid false detection of marks in the response rows;
   (2) a top end of the bar code zone, the top end of the bar code zone being located below a top edge of the form, the top end being a fourth pre-determined distance from at least one response row, the top end of the bar code zone being above the start-of-form mark and sufficiently spaced away from the response rows to avoid false detection of marks in the response rows;
   (3) a right end of the bar code zone, the right end of the bar code located at a fifth pre-determined distance from a second longitudinal edge and sufficiently spaced away from the response columns to avoid false detection of marks in the response columns; and
   (4) a left end of the bar code zone, the left end of the bar code zone being located at one of a sixth pre-determined distance from the first longitudinal edge or a seventh pre-determined distance from the response columns to avoid false detection of marks in the response columns, and
wherein the first and second bar codes on the scannable form comprise point of sale information.

33. The form of claim 32, wherein the first and second bar codes on the scannable form comprise information compatible for tracking a number of scannable forms sold or remaining in an inventory.

34. A scannable form comprising:
a. an elongate rectangular shape with first and second substantially straight longitudinal edges;
b. at least two response columns parallel to the first longitudinal edge;
c. a control mark column, parallel to the first longitudinal edge and parallel to the response columns but spaced therefrom, the control mark column containing, in a direction parallel to the first longitudinal edge:
   (1) a first set of response control marks having a first length;
   (2) a second set of response control marks having the first length;
   (3) a start-of-form mark having a second length different from the first length; and
   (4) an end-of-form mark having a third length different from the first length and the second length;
   the first set of response control marks being column aligned with the start-of-form mark and before the second set of response control marks, the start-of-form mark being column aligned before the second set of response control marks, and the second set of response control marks being column aligned before the end-of-form mark;
d. a response row corresponding to each response control mark, each response row being row aligned with the corresponding response control mark perpendicular to the first longitudinal edge, each response row containing at least two response receiving spaces, and each response receiving space being aligned in one of said response columns, the first set of response control marks being associated with response rows that have numeric value response receiving spaces;

e. a first bar code in a first location, the first location being a first pre-determined distance below the end-of-form mark, the first bar code being sufficiently spaced away from the response rows to avoid false detection of marks in the response rows; and f. a second bar code in a second location, the second being a pre-determined distance above a bottom edge of the form, the second location being a third pre-determined distance from at least one response row and a fourth pre-determined distance from one of the first and second longitudinal edges, the second bar code being sufficiently spaced away from the response rows to avoid false detection of marks in the response rows, the second bar code being sufficiently spaced away from the first bar code at a fifth pre-determined distance, wherein the second bar code is parallel to the first bar code, and wherein the second bar code is in a direction parallel to the first longitudinal edge, wherein the first and second bar codes on the scannable form comprise point of sale information.

35. The form of claim 34, wherein the first and second bar codes on the scannable form comprise information compatible for tracking a number of scannable forms sold or remaining in an inventory.

* * * * *